US012584554B2

(12) United States Patent　　　　　(10) Patent No.:　US 12,584,554 B2
Leaning　　　　　　　　　　　　　　　(45) Date of Patent:　Mar. 24, 2026

(54) UNDER-BALANCED SEAL RING

(71) Applicant: LTS Energy, Inc., Houston, TX (US)

(72) Inventor: Kevin S. Leaning, Houston, TX (US)

(73) Assignee: LTS Energy, Inc., Houston, TX (US)

( * ) Notice: Subject to any disclaimer, the term of this patent is extended or adjusted under 35 U.S.C. 154(b) by 129 days.

(21) Appl. No.: 17/776,041

(22) PCT Filed: Dec. 18, 2020

(86) PCT No.: PCT/US2020/065960

§ 371 (c)(1),
(2) Date: May 11, 2022

(87) PCT Pub. No.: WO2021/127401

PCT Pub. Date: Jun. 24, 2021

(65) Prior Publication Data

US 2022/0390015 A1　　Dec. 8, 2022

Related U.S. Application Data

(60) Provisional application No. 62/951,545, filed on Dec. 20, 2019.

(51) Int. Cl.
*F16J 15/08*　　　　(2006.01)
*F16L 17/035*　　　(2006.01)
*F16L 23/02*　　　　(2006.01)

(52) U.S. Cl.
CPC ......... *F16J 15/0887* (2013.01); *F16L 17/035* (2013.01); *F16L 23/02* (2013.01)

(58) Field of Classification Search
CPC ....... F16J 15/0887; F16J 17/035; F16L 23/02; F16L 23/20; F16L 23/22
See application file for complete search history.

(56) References Cited

U.S. PATENT DOCUMENTS 1,921,642 A * 8/1933 Stephenson ........... F16L 13/147
　　　　　　　　　　　　　　　　　　　29/512
2,687,909 A * 8/1954 Blackman ............... F16K 27/06
　　　　　　　　　　　　　　　　　　　277/651

(Continued)

FOREIGN PATENT DOCUMENTS

GB　　　　2558001 A　　7/2018
WO　　WO 2012106061 A2　8/2012

*Primary Examiner* — Christine M Mills
*Assistant Examiner* — L. Susmitha Koneru
(74) *Attorney, Agent, or Firm* — Stephen S. Hodgson

(57)　　　　　　ABSTRACT

A piping system for oil and gas in very deep water includes two opposing flanges and a seal ring between the flanges. Each flange has an annular ridge between concentric grooves. The seal ring has a radial web that connects longitudinal inner and outer sealing portions, which are received in the concentric grooves with the annular ridge received sealingly between the inner and outer sealing portions. The inner sealing portion of the seal ring is longer than the outer sealing portion. The web is as thick as or thicker than the inner and outer sealing portions. The seal ring comprises inner and outer concentric hollow cylinders having a non-uniform wall thickness and an annular rib that connects the hollow cylinders together, where one cylinder is longer than the other and where the rib has a longitudinal thickness that is as great as the radial thickness of the walls of the hollow cylinders.

41 Claims, 5 Drawing Sheets

(56)  References Cited

U.S. PATENT DOCUMENTS

| | | | | |
|---|---|---|---|---|
| 2,898,000 | A * | 8/1959 | Hanny | F16J 15/0887 |
| | | | | 285/341 |
| 3,141,685 | A | 7/1964 | Watts | |
| 3,479,063 | A * | 11/1969 | Raver | F16L 17/08 |
| | | | | 285/379 |
| 4,269,437 | A | 5/1981 | Shaw et al. | |
| 4,353,560 | A | 10/1982 | Tohill | |
| 5,466,018 | A | 11/1995 | Stobbart | |
| 5,529,284 | A | 6/1996 | Berger et al. | |
| 5,620,187 | A | 4/1997 | Jia | |
| 5,707,152 | A | 1/1998 | Krywitsky | |
| 5,752,725 | A * | 5/1998 | El-Sobky | B29C 66/5229 |
| | | | | 228/114.5 |
| 5,858,311 | A * | 1/1999 | Bachtel | C10G 49/26 |
| | | | | 285/104 |
| 6,070,912 | A * | 6/2000 | Latham | F16L 23/18 |
| | | | | 285/331 |
| 6,450,507 | B2 | 9/2002 | Johnson | |
| 6,932,655 | B2 | 8/2005 | Hjertholm | |
| 7,107,662 | B1 | 9/2006 | Levario | |
| 7,581,764 | B2 | 9/2009 | Ishihara | |
| 7,819,439 | B2 | 10/2010 | Paton et al. | |
| 8,033,579 | B2 | 10/2011 | Takeda et al. | |
| 8,096,560 | B2 | 1/2012 | Pallini, Jr. et al. | |
| 8,177,238 | B2 | 5/2012 | Allen | |
| 9,045,961 | B2 * | 6/2015 | Melancon | F16L 23/20 |
| 10,100,958 | B2 | 10/2018 | Lee et al. | |
| 10,415,729 | B2 | 9/2019 | Stobbart | |
| 2001/0045709 | A1 * | 11/2001 | Stobbart | F16L 23/18 |
| | | | | 277/602 |
| 2005/0242519 | A1 * | 11/2005 | Koleilat | F16L 17/02 |
| | | | | 277/434 |
| 2007/0267868 | A1 | 11/2007 | Holzheu | |
| 2015/0176744 | A1 | 6/2015 | Glassman et al. | |
| 2018/0030804 | A1 * | 2/2018 | Boulanger | E21B 33/038 |

* cited by examiner

FIG.2

UNDER-BALANCED SEAL RING

CROSS-REFERENCE TO RELATED APPLICATION

This is a national stage application filed under 35 U.S.C. 371 for International Application No. PCT/US2020/065960 filed on 18 Dec. 2020, which was published as Publication No. WO 2021/127401 A1, which is incorporated by reference. This application claims priority to and the benefit of U.S. Provisional Patent Application Ser. No. 62/951,545, filed Dec. 20, 2019, which is incorporated by reference.

BACKGROUND OF THE INVENTION

1. Field of the Invention

This present invention pertains to sealed connections between pipe, valves and similar equipment used in high-pressure, high-temperature applications, and more particularly to a seal ring having inner and outer sealing surfaces.

2. Description of the Related Art

Oil and gas production in very deep water requires a flow system that can contain fluid under very high pressures and temperatures while also preventing the ingress of water into the flow system at sealed joints within the flow system. Very deep water outside of the flow system can also be at a very high pressure. Flow systems for oil and gas wells drilled into an ocean floor that is under 5,000 to 10,000 feet (1,500 to 3,000 meters) of water must withstand external water pressure that ranges between about 2,200 to 4,400 psi (about 150 to 300 bar). The flow system may be designed for a fluid pressure within the flow system of about 20,000 psi (nearly 1,400 bar). Connections or joints between components of the flow system are typically made using flanges bolted together or by clamping hubs together, but can also be made using a hydraulic action. A metal seal ring is typically used to seal a connection to contain fluid within the flow system and to prevent the ingress of sea water into the flow system. In a flange-and-bolt connection, the flanges typically have a recess or a groove in which the seal ring is received or a pair of concentric grooves that define a ridge between the grooves.

A seal ring having a cross-section that has the shape of an I-beam or an H-beam or the capital letter "I" in Times New Roman font has been used in conjunction with bolted flanges that have a pair of concentric grooves for receiving the seal ring. A ring is first made from a wrought, forged metal alloy and then machined into a final shape to make a seal ring. U.S. Patent Application Pub. No. 20010045709 A1 by inventor Stobbart provides an example of this type of connection with a flange having a pair of concentric recesses on the face of the flange, which define a ridge, and a metal seal ring having a cross-section that resembles the shape of the English letter "H" in an Arial font, which has a horizontal bar between parallel and vertical lines. Stobbart defines the seal ring in terms of radially inner and outer sealing portions connected by a web, where the sealing portions are received in the recesses. The seal ring in the '709 application is symmetrical. The inner and outer sealing portions are identical.

U.S. Pat. No. 10,415,729 was issued to Stobbart for a variation in his earlier design that was intended to prevent the seal ring from sticking in the seat at make-up and is incorporated by reference for all purposes. Stobbart made the maximum radial width of the inner sealing portion greater than that width for the outer sealing portion, which provided an initial clearance gap between the outer sealing portion of the seal ring and the ridge in the flange. Stobbart said that as the flanges were tightened, the seal ring underwent an elastic deformation and provided a higher contact pressure between the inner sealing portion and the ridge than between the outer sealing portion and the ridge, which was balanced by stresses in the seal ring. If it was anticipated that water pressure outside the flanges would be greater than inside, then the width of the outer sealing portion could be made greater than the width of the inner sealing portion. The seal ring in the '729 patent is not symmetrical. The inner and outer sealing portions are not identical.

It is believed that the prior art seal rings identified above were designed for a rated working pressure (RWP) up to 15,000 psi (1,034 bar). However, newer design guidelines (API Technical Report 17TR8, second edition, March 2018) for high-pressure, high-temperature applications, particularly subsea applications, require a RWP of 20,000 psi (1,379 bar) at 350° F. (177° C.). In addition, efforts have been made to reduce the size and weight of equipment such as a blowout preventers and riser. Past designs for such equipment provided rigidity of the components, so a seal ring did not necessarily need to accommodate for non-uniform movement or thermal growth of one portion of a joint with respect to another portion of the joint. 3D Modeling assessments combined with failure mode analysis using finite element analysis has been used to reduce the size of equipment and components. It has been established that under potential operating conditions, both axial and radial displacement occurs due to pressure and thermal growth, which often is not uniform within connecting components based on material selections, and variations in mass and shape, which has led to a prediction of failure of a prior art seal ring. Consequently, there is a need for a seal ring designed for a rated working pressure of 20,000 psi (1,379 bar) and higher temperatures of 350° F. (177° C.) and above.

SUMMARY OF THE INVENTION

The present invention provides an improvement to the basic design of a seal ring having inner and outer sealing portions connected by a web or a rib. The seal ring of the present invention comprises a circular ring having a radially inner sealing portion, a radially outer sealing portion and a web that extends radially and connects the inner and outer sealing portions together. The ring has a radius and a longitudinal length that is perpendicular to the radius. The longitudinal length of the inner sealing portion is preferably greater than the longitudinal length of the outer sealing portion. The web or rib preferably has a radially inward portion that is adjacent to the inner sealing portion and a radially outward portion that is adjacent to the outer sealing portion, where preferably the web is thicker in the portion that is adjacent to the inner sealing portion than in the portion that is adjacent to the outer sealing portion. A web having two different thicknesses can better accommodate non-uniform growth of one component in a joint with respect to another component in the joint because the web or rib provides some flexibility, allowing the thinner portion of the web or rib to move and/or rotate to some extent with respect to the thicker portion of the web or rib.

In a design case in which first and second elements in a joint or connection are expected to have the same rigidity, another embodiment of the present invention is a seal ring having inner and outer sealing portions, where one sealing portion has a greater longitudinal length than the other portion, and a web or rib connecting the inner and outer sealing portions has a constant thickness throughout its entire radial length between the inner and outer sealing portions. The longitudinal thickness of the web is preferably greater than the radial thickness of each of the sealing portions at its greatest radial thickness.

In another embodiment, the present invention provides a piping system that includes at least two opposing flanges and a seal ring between and engaged with the flanges for providing a sealed connection. Each flange has an annular ridge between a pair of concentric grooves or recesses. The seal ring has inner and outer sealing portions that are received in the grooves and that matingly engage the ridge of each of the flanges for sealing the flanges together. The inner sealing portion of the seal ring is preferably axially longer than the outer sealing portion of the seal ring. A radially-extending web connects the inner and outer sealing portions together. The web is preferably thicker proximal to the inner sealing portion than proximal to the outer sealing portion. The web preferably has a first constant longitudinal thickness for about half of its radial distance that is near the inner sealing portion and a second constant longitudinal thickness for about half of its radial distance that is near the outer sealing portion, where preferably the first constant longitudinal thickness is greater than the second constant longitudinal thickness. In another embodiment, the web has a constant longitudinal or axial thickness, which is preferably greater than the radial thickness of each of the inner and outer sealing portions at its maximum radial thickness. The thicker web better reduces the hoop stress created by the hydrostatic axial force acting on the web due to the internal pressure.

BRIEF DESCRIPTION OF THE DRAWINGS

A better understanding of the invention can be obtained when the detailed description of exemplary embodiments set forth below is considered in conjunction with the attached drawings in which:

FIG. 2 is a side elevation in cross-section of the seal ring and flanges of FIG. 1 prior to bolting the flanges together;

DETAILED DESCRIPTION OF THE EXEMPLARY EMBODIMENTS

Figure 1:
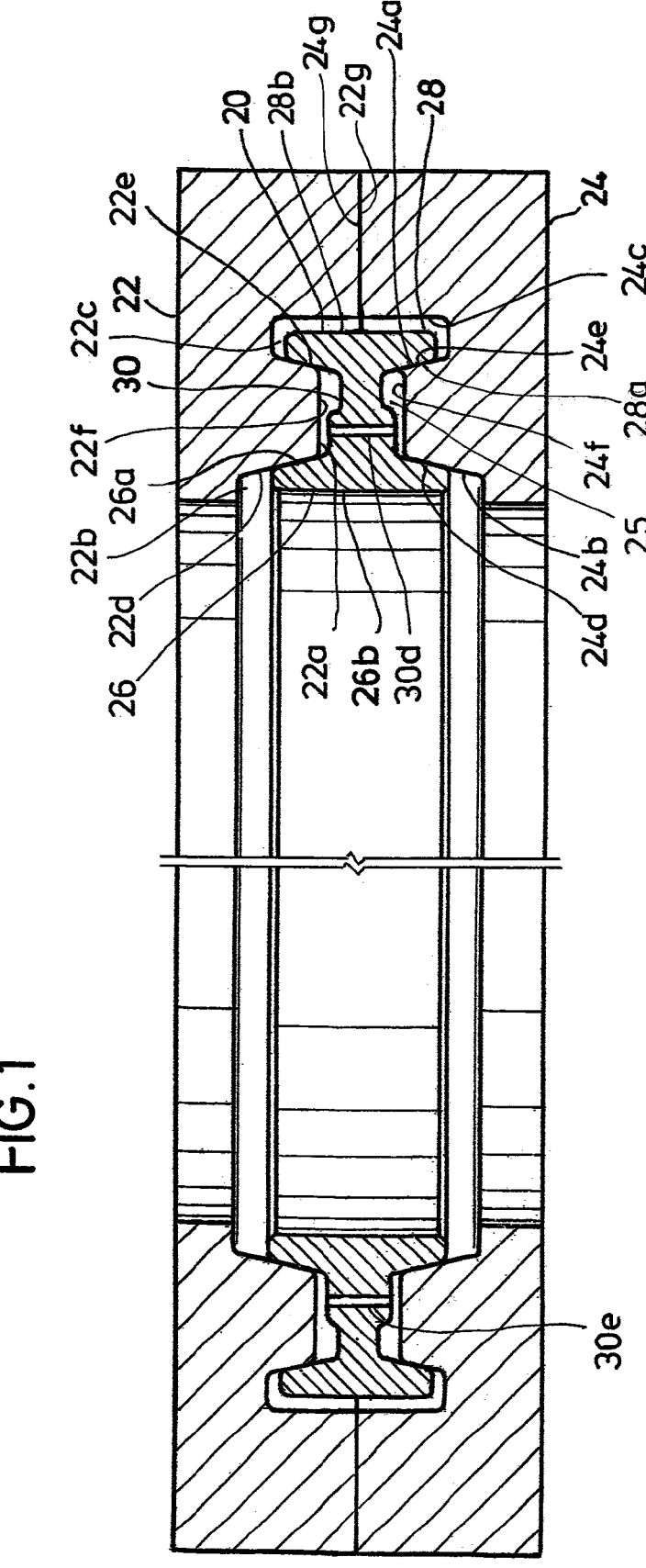
FIG. 1 is a side elevation in cross-section of a seal ring between two flanges, according to the present invention.

The present invention concerns a seal ring for providing a seal between first and second flanges or hubs in a piping or flow-containment system, where the seal ring comprises a circular ring having upstream and downstream sides, a radially inner sealing portion, a radially outer sealing portion and a web that extends radially and connects the inner and outer sealing portions together. The radially inner sealing portion provides a seal with the first and second flanges or hubs for containing a first pressurized fluid within the piping or flow-containment system. The radially outer sealing portion provides a seal with the first and second flanges or hubs for keeping a second pressurized fluid out of the piping or flow-containment system. The ring has a diameter that is coaxial with the web and a longitudinal length that is perpendicular to the diameter and extends from the upstream side to the downstream side, and the longitudinal length of the inner sealing portion is not equal to the longitudinal length of the outer sealing portion.

In one embodiment of the present invention, the circular ring consists of concentric inner and outer hollow cylinders that have non-uniform wall thicknesses, which correspond to the inner and outer sealing portions, and a rib connecting the inner and outer cylinders, which corresponds to the web, where the longitudinal length of the inner hollow cylinder is not equal to the longitudinal length of the outer hollow cylinder. In this embodiment, "consists of" means there are no other components or sealing elements or connections between the inner and outer hollow cylinders; there are just three things in this embodiment, namely an inner hollow cylinder, an outer hollow cylinder, which surrounds the inner hollow cylinder, and a rib that connects the inner and outer cylinders together, where the rib is in an annular space defined between the inner and outer cylinders. The longitudinal length of the inner hollow cylinder is preferably greater than the longitudinal length of the outer hollow cylinder. The rib preferably has the shape of a disc with a hole in it, which is an annulus, where the inner cylinder is in the hole in the disc/rib and the outer cylinder surrounds the disc/rib, where the inner and outer cylinders are preferably formed integral with the disc/rib, where the disc/rib is preferably centered between the upstream side and the downstream side of the inner and outer cylinders. The disc/rib has a thickness between its upstream and downstream sides, and the thickness of the disc/rib is preferably greater than the radial thickness of each of the inner and outer sealing portions. The disc/rib has a radial width between inner and outer hollow cylinders, and the radial width of the disc/rib is preferably at least one-third, more preferably at least about 40%, of the longitudinal length of each of the inner and outer hollow cylinders. Likewise, the web has a radial width between inner and outer sealing portions, and the radial width of the web is preferably at least one-third, more preferably at least about 40%, of the longitudinal length of each of the inner and outer sealing portions.

Figure 2:
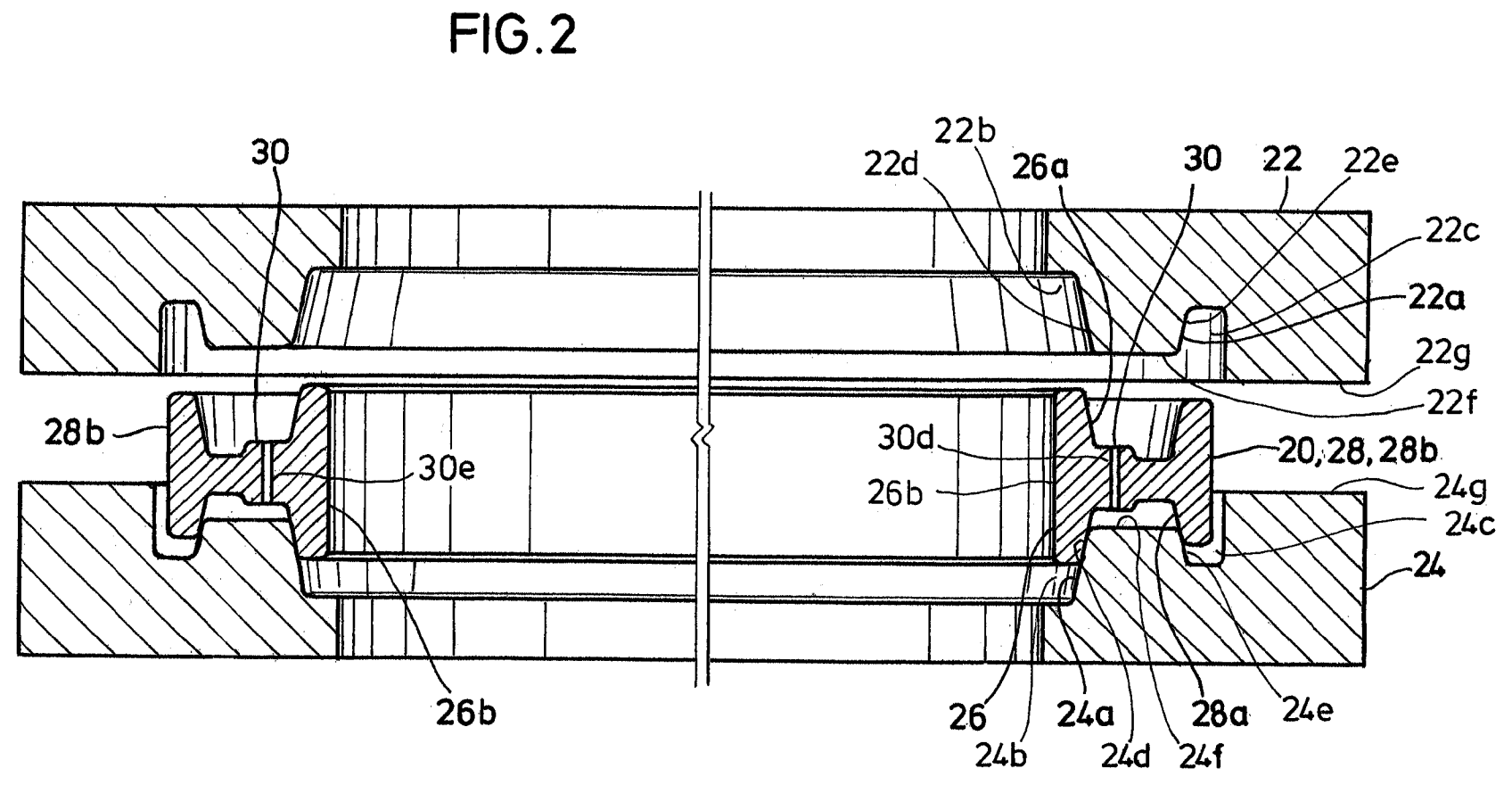

With reference to FIGS. 1 and 2, a seal ring 20 is shown between flanges 22 and 24, according to the present invention. Flanges 22 and 24 have been bolted together in FIG. 1, although no bolts are shown. Seal ring 20 has been received in flange 24 in FIG. 2, but flange 22 has not yet been engaged with flange 24, thereby allowing one to see the features in flange 22 more clearly than after engagement with the seal ring 20 and the flange 24. Seal ring 20 is referred to as an under-balanced seal. Seal ring 20 has an inner sealing portion 26 and an outer sealing portion 28. The inner and outer sealing portions 26 and 28 are typically called seal lips. A rib or web 30 connects the inner and outer sealing portions 26 and 28 together.

The flanges 22 and 24 have annular ridges 22a and 24a, respectively. The annular ridges 22a and 24a are arranged opposite of each other and are radially narrower at a tip than at a base portion within the bulk of the respective flange. Each of the ridges 22a and 24a has a trapezoidal shape. The annular ridges 22a and 24a have sloping faces. Flange 22 has an inner groove 22b that provides a recess along the inner circumference of flange 22 and an outer groove 22c that provides a recess in the face of the flange approximately midway between its inner and outer circumferences. The inner groove 22b is a deeper recess than the outer groove 22c. The inner and outer grooves 22b and 22c may be referred to as seat pockets. Flange 24 has an inner groove 24b that provides a recess along the inner circumference of flange 24 and an outer groove 24c that provides a recess in the face of the flange approximately midway between its inner and outer circumferences. The inner groove 24b is a deeper recess than the outer groove 24c. Ridge 22a has an inner face 22d toward the inside of the flange 22 and an outer face 22e toward the outside of the flange 22. Ridge 22a has an end face 22f. Flange 22 has an end 22g, and the end face 22f of the ridge 22a is inset with respect to the end 22g of the flange 22. Ridge 24a has an inner face 24d toward the inside of the flange 24 and an outer face 24e toward the outside of the flange 24. Ridge 24a has an end face 24f. Flange 24 has an end 24g, and the end face 24f of the ridge 24a is inset with respect to the end 24g of the flange 24.

The inner sealing portion 26 and the outer sealing portion 28 of the seal ring 20 have sloping sides 26a and 28a, respectively, that face each other and that correspond to the slope of the sloping faces of the annular ridges 22a and 24a of the flanges 22 and 24, respectively. Sloping side 26a slopes at an equal and opposite angle with respect to the inner face 22d of the flange 22 and at an equal and opposite angle with respect to the inner face 24d of the flange 24. Sloping side 28a slopes at an equal and opposite angle with respect to the outer face 22e of the flange 22 and at an equal and opposite angle with respect to the outer face 24e of the flange 24. The sloping sides 26a and 28a slope at an angle of preferably 15 to 20 degrees. The sloping side 26a seals against the inner faces 22d and 24d of the annular ridges 22a and 24a, respectively. The sloping side 28a seals against the outer faces 22e and 24e of the annular ridges 22a and 24a, respectively. The faces of the flanges 22 and 24 are in contact and under the compressive force of the flange bolts after being bolted together. As the flanges 22 and 24 are pulled closer and closer together as bolts in the flanges are tightened, seal ring 20 is compressed and pressed into the seat pockets in the flanges 22 and 24, undergoing elastic deformation from which it can recover, without plastic deformation from which it would not be able to recover. Consequently, seal ring 20 is reusable.

The inner sealing portion 26 of seal ring 20 has a radially inward side 26b that opposes the sloping side 26a. When the seal ring 20 and the flanges 22 and 24 are part of a piping system, the radially inward side 26b would be in contact with fluid within the piping system. The fluid within the piping system may be under a pressure of 15,000 to 30,000 psi, and a design pressure of 20,000 psi is a potential service application. The fluid within the piping system may also be at a very high temperature, possibly from hundreds of degrees to over a thousand degrees Fahrenheit. The radially inward side 26b is shown as straight and without any longitudinal slope or curvature, but it is possible to include longitudinal slope and/or curvature. The radially inward side 26b does have the curvature of the arc of a circle due to its ring shape. The outer sealing portion 28 has a radially outward side 28b that opposes the sloping side 28a. A typical application for seal 20 and flanges 22 and 24 is in oil and gas service deep under water. A function of the outer sealing portion 28 is to seal and prevent high-pressure sea water from entering the piping system. A typical design pressure for the outer sealing portion 28 may be 5,000 psi. The radially outward side 28b of the outer sealing portion 28 is shown as straight and without any longitudinal slope or curvature, but it is possible to include longitudinal slope and/or curvature. The radially outward side 28b does have the curvature of the arc of a circle due to its ring shape.

An application for the seal ring 20 and the flanges 22 and 24 is within a piping system that may include valves and a blowout preventer. In the context of two straight sections of pipe, where one pipe has the flange 22 and the other pipe has the flange 24, there is a longitudinal axis within the pipe. The inner sealing portion 26 and the outer sealing portion 28 each have a length that is parallel to the longitudinal axis in the pipe. The length of the inner sealing portion 26 is greater than the length of the outer sealing portion 28. The inner sealing portion 26 and the outer sealing portion 28 are asymmetrical with respect to the longitudinal length of each, with the length of the inner sealing portion 26 being greater than the length of the outer sealing portion 28.

Figure 3:
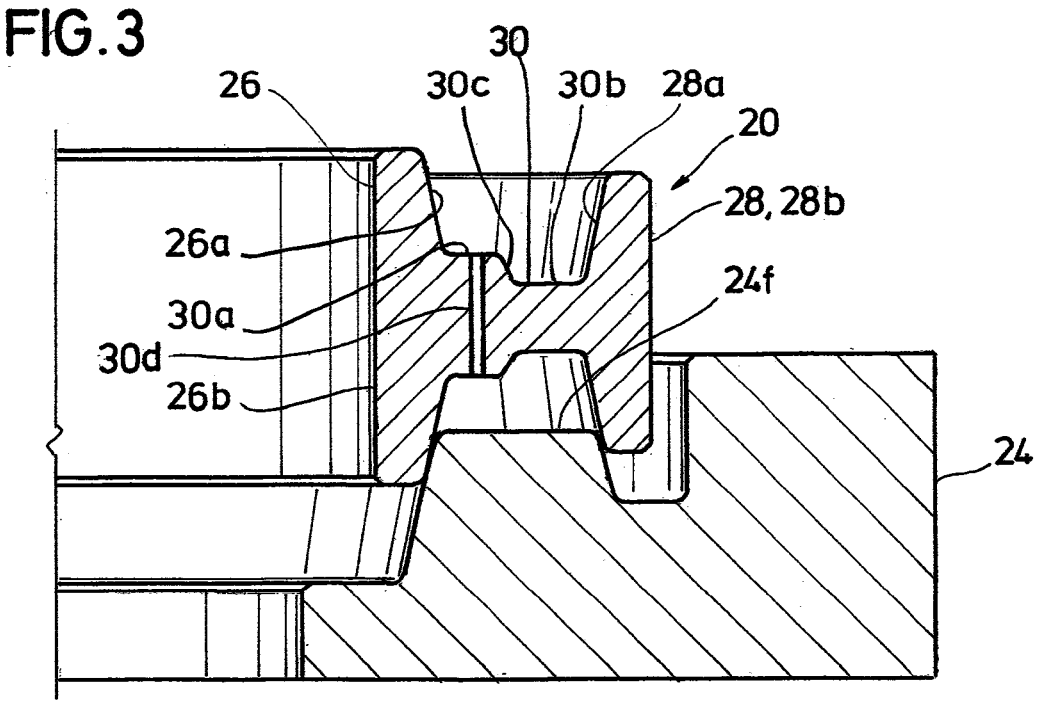
FIG. 3 is an enlarged view of the right side of FIG. 2 without the upper flange.
Figure 4:
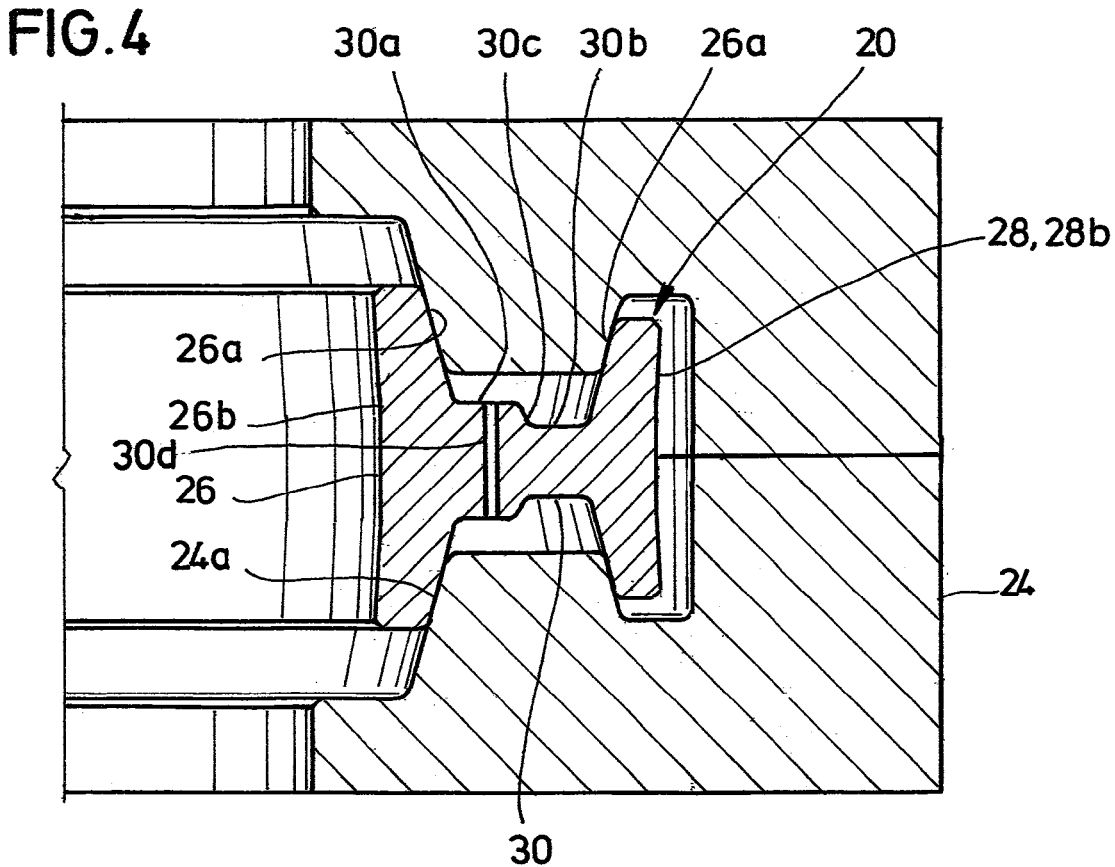
FIG. 4 is an enlarged view of the right side of FIG. 1 while in service with pressurized fluid inside and outside of the flanges and the seal ring.

FIG. 3 is an enlarged view of the right side of FIG. 2, except without the flange 22. FIG. 4 is an enlarged view of the right side of FIG. 1, except in service with fluid pressure inside the piping system pushing the inner sealing portion 26 outwardly and water pressure on the outside pushing the outer sealing portion 28 inwardly. The inner and outer sealing portions 26 and 28 are asymmetrical because they have different axial or longitudinal lengths. Web 30 is also asymmetric. With reference to FIGS. 3 and 4, web 30 has a radially inward portion 30a that is adjacent to the inner sealing portion 26 and a radially outward portion 30b that is adjacent to the outer sealing portion 28. Web 30 has a greater axial or longitudinal thickness in portion 30a adjacent to the inner sealing portion 26 than it does in portion 30b adjacent to the outer sealing portion 28. Web 30 has a radially outwardly sloping transition or shoulder 30c located at about the midpoint between the inner sealing portion 26 and the outer sealing portion 28. Web 30 preferably has at least one and is shown as having two holes 30d and 30e through its longitudinal or axial thickness, which allow pressure equalization within a cavity 25 defined by the flanges 22 and 24 and the inner and outer sealing portions 26 and 28 and which also allows for a reverse integrity test of the seal ring 20 to be conducted.

A commercial embodiment of the prior art U.S. Patent Application Pub. No. 20010045709 A1 by inventor Stobbart is a Vector Duoseal™ seal ring sold by Freudenberg Oil and Gas Technologies. The Vector Duoseal™ seal ring is believed to be symmetrical with respect to the length of its inner and outer sealing portions and with respect to its web, which has a constant thickness throughout its radial length. Even the thinner portion 30b of web 30 of seal ring 20 of the present invention is thicker than the prior art Vector Duoseal seal ring. Web 30 of the present invention is thicker than the web in the prior art Vector Duoseal seal ring because the inventive seal ring 20 is designed to withstand higher pressures and higher temperatures than the prior art Vector Duoseal seal ring. Seal ring 20 is better suited for combinations of high pressure (up to 20,000 to 30,000 psi) and high temperature applications than the prior art Vector Duoseal seal ring. Seal ring 20 provides advantages where upper and lower flanges experience movement from hydrostatic end load and thermal transient conditions, which distorts the flanges around the seating area. Seal ring 20 is considered to be a flexible seal ring, which handles movement in the flanges better than a rigid seal ring. In high pressure and high temperature applications, the flanges 22 and 24 and their annular ridges 22a and 24a can move due to external forces or to changes in pressure or temperature. The thinner portion 30b of the web 30 can twist or rotate and/or bend with respect to the thicker portion 30a of the web 30, which allows non-uniform movement of flange 22 (or a hub) with respect to flange 24 (or another hub in a joint). Seal ring 20 of the present invention is believed to accommodate such movement better than the Vector Duoseal seal ring can.

Figures 5, 6:
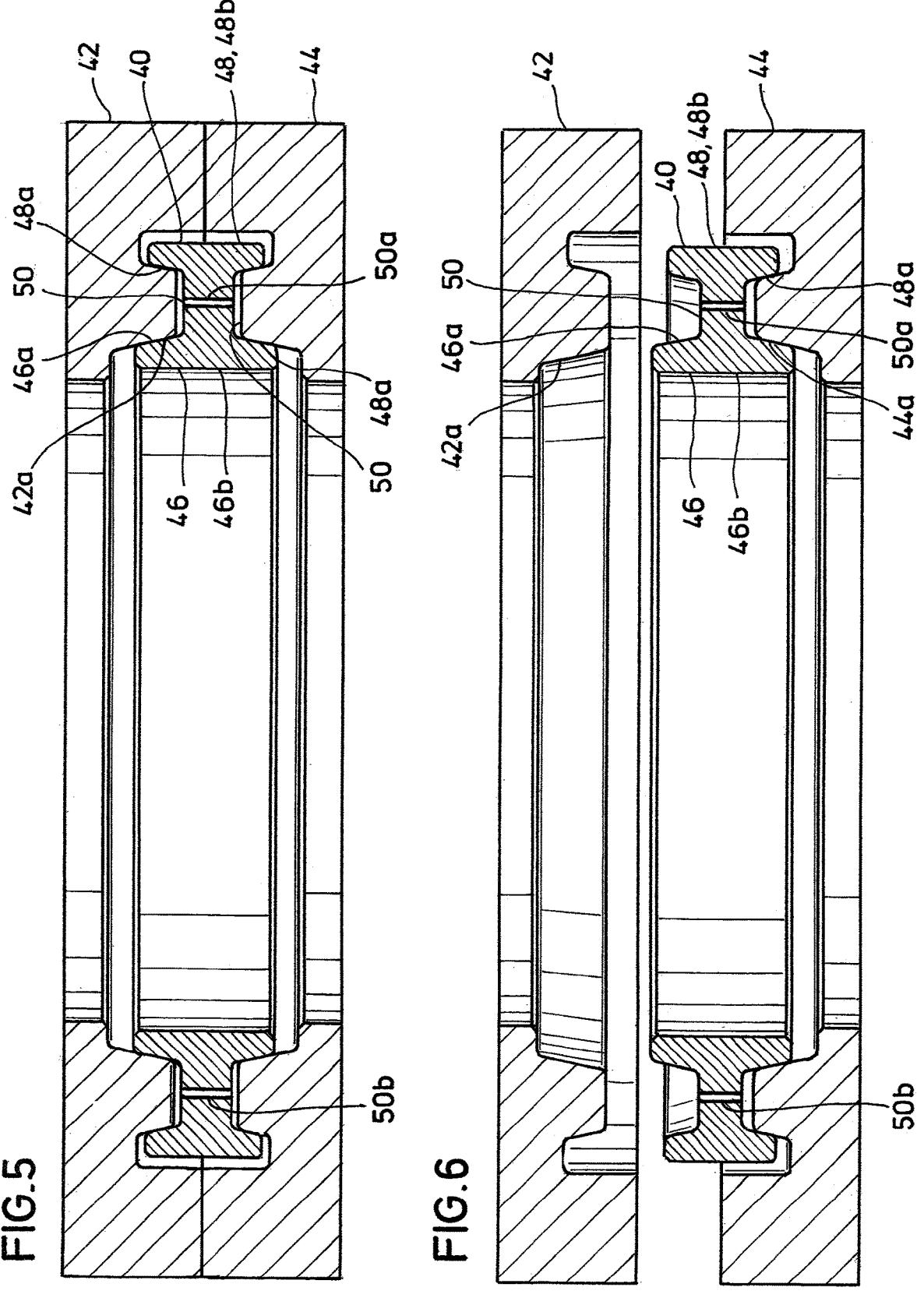
FIG. 5 is a side elevation in cross-section of a seal ring between two flanges, according to the present invention.
FIG. 6 is a side elevation in cross-section of the seal ring and flanges of FIG. 5 prior to bolting the flanges together.

Turning now to FIGS. 5 and 6, flanges in FIG. 5 have been bolted together as in FIG. 1, although no bolts are shown, but the flanges in FIG. 6 have not yet been joined as in FIG. 2. A seal ring 40 is shown in the same manner as seal ring 20 in FIG. 1 and is the same as seal ring 20, except seal ring 40 has a web 50 that has a constant thickness rather than a thicker portion and a thinner portion. Web 50 is substantially thicker than the web of the prior art Vector Duoseal seal ring. The web of the prior art Vector Duoseal seal ring is believed to have a longitudinal thickness that is substantially less than half of the longitudinal length of its inner and outer sealing portions. Web 50 of the present invention has a longitudinal thickness that is about half of the longitudinal length of the inner sealing portion 46. Web 50 is about as thick as the thicker portion 30a of web 30 in FIGS. 1-4. Web 50 is shown as having two longitudinal or axial through holes 50a and 50b for pressure equalization and for a reverse integrity test. Seal ring 20 of FIGS. 1-4 is referred to as a flexible under-balanced seal. Seal ring 40 is considered more suitable than seal ring 20 for applications in which the flanges and their sealing surfaces are not expected to move, contract or expand, after being placed in service. Webs 30 and 50 also have a radial length that extends from the inner sealing portion to the outer sealing portion. The radial length of each of the webs 30 and 50 is at least about a third of the longitudinal length of the outer sealing portion and preferably at least about a third of the longitudinal length of the inner sealing portion.

Seal ring 40 has an inner sealing portion 46 and an outer sealing portion 48. Web 50 connects the inner and outer sealing portions 46 and 48 together. Seal ring 40 is captured between flanges 42 and 44, which have annular ridges 42a and 44a, respectively. The annular ridges 42a and 44a are arranged opposite of each other and are radially narrower at a tip than at a base portion. The annular ridges 42a and 44a have sloping faces. Flanges 42 and 44 are the same as flanges 22 and 24, respectively, in FIG. 1, and the annular ridges 42a and 44a are the same as the annular ridges 22a and 24a in FIG. 1. The flanges 42 and 44 have the same concentric grooves on either side of the annular ridge as the flanges 22 and 24. The annular ridges 42a and 44a have the same inner and outer faces as described above for flanges 22 and 24.

The inner sealing portion 46 and the outer sealing portion 48 have sloping sides 46a and 48a, respectively, that face each other and that correspond to and mate with the slope of the inner and outer faces of the annular ridges 42a and 44a of the flanges 42 and 44, respectively. The sloping sides 46a and 48a slope at an angle of preferably 15 to 20 degrees. The sloping sides 46a and 48a seal against the inner and outer faces of the annular ridges 42a and 44a. The inner sealing portion 46 has a radially inward side 46b that opposes the sloping side 46a. When the seal ring 40 and the flanges 42 and 44 are part of a piping system, the radially inward side 46b would be in contact with fluid within the piping system. The fluid within the piping system may be under a pressure of 15,000 to 30,000 psi, and a design pressure of 20,000 psi is a potential service application. The fluid within the piping system may also be at a very high temperature, possibly from hundreds of degrees to over a thousand degrees Fahrenheit. The radially inward side 46b is shown as straight and without any longitudinal slope or curvature, but it is possible to include longitudinal slope and/or curvature. The radially inward side 46b does have the curvature of the arc of a circle due to its ring shape. The outer sealing portion 48 has a radially outward side 48b that opposes the sloping side 48a. A typical application for seal 40 and flanges 42 and 44 is in oil and gas service in water as deep as a mile or two, which exerts a pressure force of from about 2,200 to about 4,400 psi (about 150 to 300 bar). A function of the outer sealing portion 48 is to seal and prevent high-pressure sea water from entering the piping system. A typical design pressure for the outer sealing portion 28 may be 5,000 psi. The radially outward side 48b of the outer sealing portion 48 is shown as straight and without any longitudinal slope or curvature, but it is possible to include longitudinal slope and/or curvature. The radially outward side 48b does have the curvature of the arc of a circle due to its ring shape.

Like seal ring 20, in seal ring 40, the length of the inner sealing portion 46 is greater than the length of the outer sealing portion 48. The inner sealing portion 46 and the outer sealing portion 48 are asymmetrical with respect to the longitudinal length of each, with the length of the inner sealing portion 46 being greater than the length of the outer sealing portion 48. The under-balanced seal rings 20 and 40 of the present invention each have inner and outer sealing portions in which the longitudinal length of the inner sealing portion is greater than the longitudinal length of the outer sealing portion. The longer inner sealing portions 26 and 46 are designed to seal and contain a higher pressure inside the seal rings 20 and 40 than the shorter outer sealing portions 28 and 48. This can be reversed if the pressure is greater outside than inside the seal ring.

Figure 7:
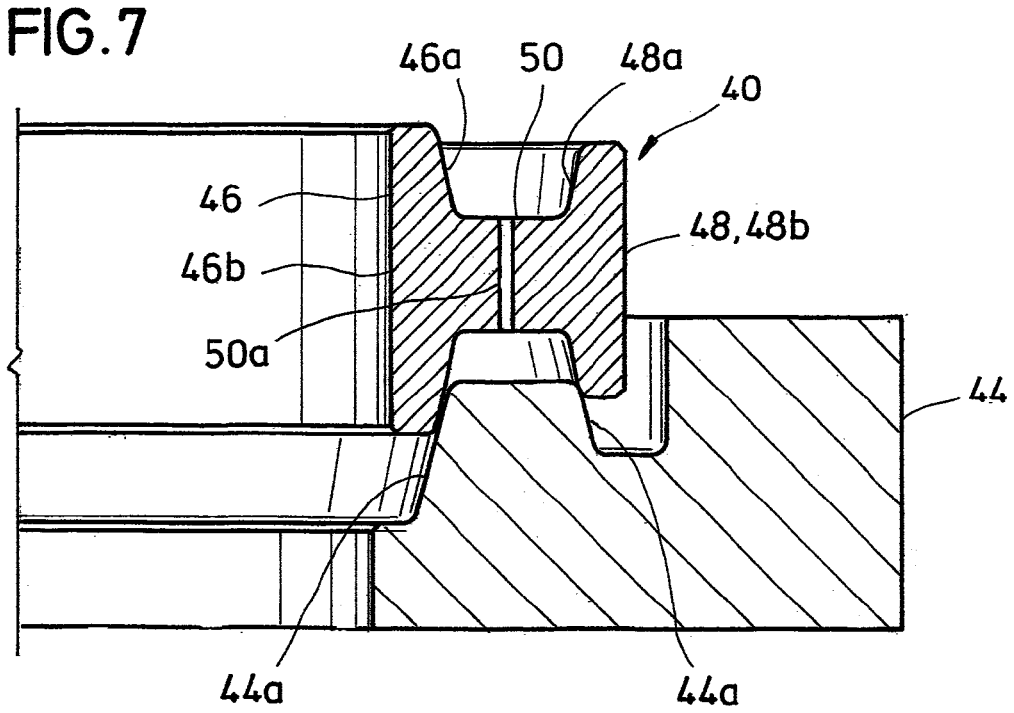
FIG. 7 is an enlarged view of the right side of FIG. 5 without the upper flange.
Figure 8:
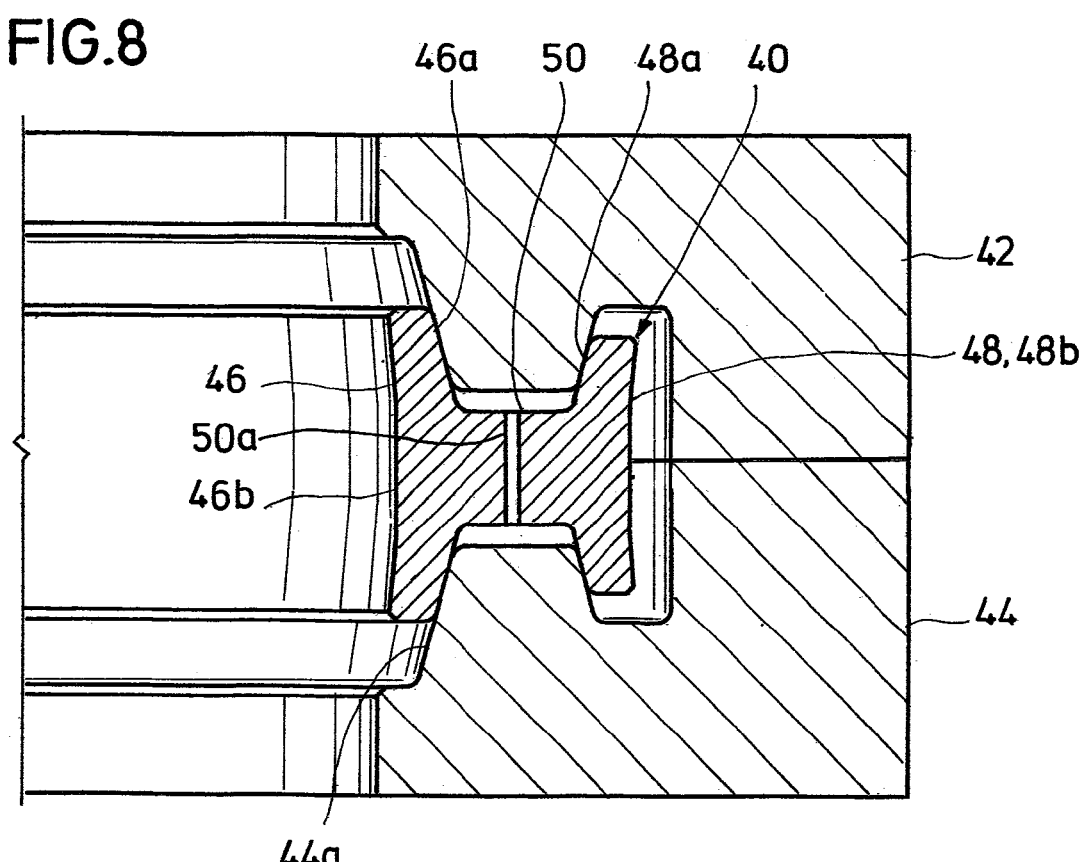
FIG. 8 is an enlarged view of the right side of FIG. 5 while in service with pressurized fluid inside and outside of the flanges and the seal ring.

FIG. 7 is an enlarged view of the right side of FIG. 5, except without the flange 42. FIG. 8 is an enlarged view of the right side of FIG. 5, except in service with fluid pressure inside the piping system pushing the inner sealing portion 46 outwardly and water pressure on the outside pushing the outer sealing portion 48 inwardly. The inner and outer sealing portions 46 and 48 are asymmetrical because they have different axial or longitudinal lengths.

FIGS. 3 and 7 show seal rings 20 and 40, respectively, while the seal rings are not under pressure and are not containing a pressurized fluid or in deep water. FIGS. 4 and 8 show the seal rings 20 and 40, respectively, while containing a fluid inside the seal ring that is at a high pressure, such as at 20,000 psi, and while excluding very deep water, which is under a pressure, such as 4,000 psi or more. The inner sealing portions 26 and 46 in FIGS. 4 and 8 bow slightly radially outwardly due to the high pressure inside the seal ring. The outer sealing portions 28 and 48 in FIGS. 4 and 8 bow slightly radially inwardly due to the high pressure of deep water outside the seal ring. The seal rings 20 and 40 are self-energized, meaning no fluid pressure is required to effect a seal. However, the interior and exterior fluid pressures on the seal rings 20 and 40 further energize the seal rings and increase the contact pressure of the inner and outer sealing portions on the inner and outer faces of their respective annular ridges, thereby further ensuring no leakage at the interfaces between the sealing portions on the seal rings and the inner and outer faces of the annular ridges on the ends of the flanges.

Another desirable feature for a seal ring is that the seal ring should not become stuck in a flange after a period of use and the flanges are taken apart. If a pair of flanges are disconnected in a workshop on land, this may not be a significant issue. However, if a pair of flanges or hubs are disconnected by a remotely-operated, submersible vehicle that is 10,000 feet (3 kilometers) under water and a seal ring is stuck in a flange or hub when it is supposed to be retrieved, then this is a problem. The longitudinal length of the inner and outer sealing portions of the seal rings 20 and 40 of the present invention are different, which causes the seal rings 20 and 40 of the present invention to release from a disconnected flange or hub more readily than if the inner and outer sealing portions are symmetrical. The longitudinal length of the outer sealing portion is preferably less than 95% and is more preferably less than 87% of the longitudinal length of the inner sealing portion. The seal ring disclosed in the Stobbart U.S. Pat. No. 10,415,729 patent has inner and outer sealing portions that are symmetrical with respect to their longitudinal length, although one sealing portion is thicker than the other sealing portion. Testing has shown that the non-symmetry with respect to the length of the inner and outer sealing portions allows the seals of the present invention to release from a disconnected flange or hub much more readily than a prior art seal that is symmetrical with respect to the height of the inner and outer sealing portions.

The seal ring disclosed in the Stobbart '729 patent is non-symmetrical with respect to the thickness of its inner and outer sealing portions, which creates an initial clearance gap between the thinner sealing portion and the corresponding ridge in the flanges that are to be sealed. However, the longitudinal length of the inner and outer sealing portions in the seal ring disclosed in the Stobbart '729 patent are symmetrical, while the inner and outer sealing portions of the seal rings 20 and 40 of the present invention are not symmetrical with respect to longitudinal length. The inner and outer sealing portions of the seal rings 20 and 40 of the present invention may also not be symmetrical with respect to radial thickness. The inner sealing portion may be thicker than the outer sealing portion, since the inner sealing portion is designed for a higher pressure than the outer sealing portion. In any case, the inner and outer sealing portions of the seal rings 20 and 40 of the present invention contact and engage the annular ridges in the flanges at the same time. In the present invention, there is no initial clearance gap between one of the sealing portions and the annular ridges in the flanges as in the Stobbart '729 patent. The inner and outer seal lips engage the seat pockets in the flanges or hubs at the same time in the present invention, not first one and then the other as in the Stobbart '729 patent.

Much of the discussion above has concerned the inner and outer sealing portions of seal rings 20 and 40, but the respective webs or ribs 30 and 50 are also important aspects of the seal rings. The Stobbart '729 patent teaches in column 6, lines 20-30, that the thickness of the web should be reduced to allow radial deformation of the web, stating: "[i]t will be appreciated that extension of the web portion 8 substantially radially occurs and reduction of the thickness of the web portion in a substantially perpendicular direction to the radial reduces the strength of the web portion allowing increased radial deformation. In such situations, it may be beneficial to provide a plurality of spaced-apart apertures which even more beneficially may be provided at regular intervals extended through the web portion 8. This has the effect that the strength of the web portion 8 is reduced thus increasing the elastic deformation of the web portion that is possible."

The drawings in the Stobbart '729 patent indicate that the thickness of his web 8 is less than the thickness of his outer sealing portion 9 at the thickest portion of outer sealing portion 9, which is adjacent to the web 8. The outer sealing portion 9 is thinner than the inner sealing portion 5. The present inventor ran many computer simulations and discovered using finite element analysis that the web should be made thicker, not thinner as taught in the Stobbart '729 patent. With reference to FIGS. 5 and 6 herein, web or rib 50 of the present invention is massive in comparison to the inner and outer sealing portions 46 and 48, respectively. Web 50 is shown as thicker than either of the inner and outer sealing portions 46 and 48. Web 50 is preferably at least as thick as either of the inner and outer sealing portions 46 and 48 and more preferably at least as thick as the thicker of the inner and outer sealing portions 46 and 48. Rib or web 30 in FIGS. 1-4 herein has a radially inward portion 30a and a radially outward portion 30b, where the inward portion 30a is thicker than the outward portion 30b. The radially inward portion 30a of web 30 is thicker than the thickest portion of inner sealing portion 26, although it may be adequate for portion 30b to be at least as thick as the thickest portion of inner sealing portion 26. The radially outward portion 30b of web 30 is at least as thick and is preferably thicker than the thickest portion of outer sealing portion 28. The thicker web better reduces the hoop stress created by the hydrostatic axial force acting on the web due to the internal pressure, which does not happen in a seal ring made according to the Stobbart '729 patent.

After many, many experiments or iterations of a 3D Modeling assessments combined with failure mode analysis using finite element analysis, the present inventor discovered a set of conditions in which a seal ring according to the present invention can satisfy the requirement of a rated working pressure of 20,000 psi (1,379 bar) internal pressure and 5,000 psi (345 bar) external pressure and release from a flange after being in service. The present inventor discovered that the longitudinal length of the inner and outer sealing portions of the seal ring should not be the same and the thickness of the web is preferably thicker than the thickest portion of the sealing portion of the seal ring. The present inventor believes that a more massive or thicker rib or web prevents the sealing portions from toppling while being made up or under the rated working pressure and the non-symmetrical longitudinal length of the sealing portions allows the seal ring to release from a flange or hub after being in service. This is contrary to the teachings of the Stobbart '729 patent, which teaches that the web should be thin or weak to allow radial deformation. The present inventor discovered that allowing radial deformation is not of much concern; instead, in the embodiment of FIGS. 1-4, thinner and thicker portions of the web allows some twisting and bending within the web while maintaining seal contact between the sealing portions of the web and the annular ridge in the flange or hub; and in the embodiment of FIGS. 4-8, the thick web helps to accommodate the working pressure, while in all embodiments, the non-symmetrical longitudinal length of the inner and outer sealing portions allows the seal ring to release from a flange or hub after being in service. Further, the seal ring of the present invention is reusable because there is only elastic deformation during service at the rated working pressure of 20,000 psi without plastic deformation.

Having described the invention above, various modifications of the techniques, procedures, materials, and equipment will be apparent to those skilled in the art. It is intended that all such variations within the scope and spirit of the invention be included within the scope of the appended claims.

What is claimed is:

1. A seal ring for providing a seal between first and second flanges or hubs in a piping or flow-containment system, the seal ring comprising:

a circular ring having upstream and downstream sides, a radially inner hollow cylinder, a radially outer hollow cylinder and a web that extends radially and connects the inner and outer hollow cylinders together, wherein the inner and outer hollow cylinders have sloping sides for providing a sealing surface, a radially inner sealing portion provided by the inner hollow cylinder, a radially outer sealing portion provided by the outer hollow cylinder, wherein the inner and outer hollow cylinders have non-uniform wall thicknesses due to the sloping sides, wherein the radially inner hollow cylinder provides a seal with the first and second flanges or hubs for containing a first pressurized fluid within the piping or flow-containment system, wherein the radially outer hollow cylinder provides a seal with the first and second flanges or hubs for keeping a second pressurized fluid out of the piping or flow-containment system, and wherein the web has first and second portions that have different thicknesses and a sloping transition or a shoulder between the first and second portions for allowing non-uniform movement of the first flange with respect to the second flange.

2. The seal ring of claim 1, wherein the longitudinal length of the inner hollow cylinder is not equal to the longitudinal length of the outer hollow cylinder.

3. The seal ring of claim 2, wherein the longitudinal length of the inner hollow cylinder is greater than the longitudinal length of the outer hollow cylinder.

4. The seal ring of claim 1, wherein the web has a first longitudinal thickness at a point proximal to the inner hollow cylinder and a second longitudinal thickness at a point proximal to the outer hollow cylinder, and wherein the first longitudinal thickness is greater than the second longitudinal thickness.

5. The seal ring of claim 4, wherein the longitudinal length of the inner hollow cylinder is greater than the longitudinal length of the outer hollow cylinder.

6. The seal ring of claim 1, wherein the circular ring has a longitudinal axis, wherein the web has first and second cross-sections parallel to the longitudinal axis of the circular ring, wherein the first cross-section has a first cross-sectional area at a point proximal to the inner hollow cylinder, wherein the second cross-section has a second cross-sectional area at a point proximal to the outer hollow cylinder, and wherein the first cross-sectional area is not equal to the second cross-sectional area.

7. The seal ring of claim 6, wherein the first cross-sectional area of the web is greater than the second cross-sectional area of the web.

8. The seal ring of claim 7, wherein the second cross-sectional area of the web has a thickness between the upstream and downstream sides of the circular ring, wherein the outer hollow cylinder has a radial thickness adjacent to the web, and wherein the thickness of the second cross-sectional area of the web is greater than the radial thickness of the outer hollow cylinder.

9. The seal ring of claim 1, wherein each of the inner and outer hollow cylinders has a cylindrical shape that has a straight outer side and an inner side that slopes from the web toward each of the upstream side and the downstream side such that each of the inner and outer hollow cylinders is thicker adjacent to the web than at its respective upstream side or downstream side, and wherein the circular ring is designed and configured to undergo elastic deformation without undergoing plastic deformation while being placed into service between the first and second flanges or hub.

10. The seal ring of claim 1, wherein the web has a radial length between the inner and outer hollow cylinders, and wherein the radial length of the web is at least one-third of the longitudinal length of the outer hollow cylinder.

11. A seal ring for providing a seal between first and second flanges in a piping system, wherein each flange has a face in which an annular ridge is provided between concentric grooves, the seal ring comprising:

a circular ring that consists of inner and outer hollow cylinders and a web that connects the inner and outer hollow cylinders together, wherein the circular ring has upstream and downstream sides, a radially inner sealing portion provided by the inner hollow cylinder, a radially outer sealing portion provided by the outer hollow cylinder, wherein the inner and outer hollow cylinders have non-uniform wall thicknesses due to the sloping sides, wherein the web extends radially and connects the inner and outer sealing portions together, wherein the web and the inner and outer sealing portions are designed and sized so that the annular ridge of the first flange can be received between the inner and outer sealing portions on the upstream side of the circular ring and the annular ridge of the second flange is received between the inner and outer sealing portions on the downstream side of the circular ring, without any other sealing element, wherein the web and the inner and outer sealing portions are designed and sized so that the inner and outer sealing portions on the upstream and downstream sides of the circular ring sealingly engage the annular ridge of the first and second flanges, respectively, without any other sealing element, wherein the circular ring has a radius and a longitudinal length that is perpendicular to the radius and extends from the upstream side to the downstream side, and wherein the longitudinal length of the inner sealing portion is greater than the longitudinal length of the outer sealing portion, and wherein the web has a first longitudinal thickness proximal to the inner hollow cylinder and a second longitudinal thickness proximal to the outer hollow cylinder, and a sloping transition or a shoulder between the first and second longitudinal thicknesses.

12. The seal ring of claim 11, wherein the first longitudinal thickness is greater than the second longitudinal thickness.

13. The seal ring of claim 12, wherein the web has a radially outwardly sloping shoulder located at about the midpoint between the inner sealing portion and the outer sealing portion.

14. The seal ring of claim 13, wherein the greater longitudinal thickness of the web is about one half of the longitudinal length of the inner sealing portion.

15. The seal ring of claim 11, wherein the web has a radial length between the inner and outer sealing portions, and wherein the radial length of the web is at least one-third of the longitudinal length of the inner sealing portion.

16. The seal ring of claim 11, wherein the longitudinal length of the outer sealing portion is less than 95% of the longitudinal length of the inner sealing portion.

17. The seal ring of claim 11, wherein the longitudinal length of the outer sealing portion is less than 87% of the longitudinal length of the inner sealing portion.

18. The seal ring of claim 11, wherein the circular ring is designed and sized so that the inner sealing portion can seal against the annular ridges in the first and second flanges for containing fluid in the piping system at 20,000 psi (1,379 bar) without leakage and without undergoing plastic deformation.

19. The seal ring of claim 18, wherein the circular ring is designed and sized so that the outer sealing portion can seal against the annular ridges in the first and second flanges for preventing water having a pressure of about 5,000 psi (345 bar) from getting into the piping system, and wherein the circular ring is designed and configured to be self-energized such that no fluid pressure is required to effect a seal.

20. The seal ring of claim 11, wherein the circular ring is designed and configured to be reusable because there is only elastic deformation during service at a rated working pressure of 20,000 psi without plastic deformation.

21. The seal ring of claim 11, wherein the web has at least one hole extending from its upstream side to its downstream side.

22. A seal ring for providing a seal between first and second flanges in a piping system, wherein each flange has a face in which an annular ridge is provided between concentric grooves, the seal ring comprising: a circular ring having upstream and downstream sides, a radially inner sealing portion, a radially outer sealing portion and a web that extends radially and connects the inner and outer sealing portions together integrally, wherein the web and the inner and outer sealing portions are designed and configured so that the annular ridge of the first flange can be received between the inner and outer sealing portions on the upstream side of the circular ring and the annular ridge of the second flange is received between the inner and outer sealing portions on the downstream side of the circular ring, wherein the web and the inner and outer sealing portions are designed and configured so that the inner and outer sealing portions on the upstream and downstream sides of the circular ring sealingly engage the annular ridge of the first and second flanges, respectively, wherein the circular ring has a radius and a longitudinal length that is perpendicular to the radius and extends from the upstream side to the downstream side, wherein the longitudinal length of the inner sealing portion is greater than the longitudinal length of the outer sealing portion, wherein the inner sealing portion and the outer sealing portion of the seal ring have sloping sides that face one another, wherein the inner and outer sealing portions are concentric hollow cylinders that have non-uniform wall thicknesses due to the sloping sides, and wherein the web has first and second portions that have different thicknesses and a sloping transition or a shoulder between the first and second portions for allowing non-uniform movement of the first flange with respect to the second flange.

23. The seal ring of claim 22, wherein the inner sealing portion has a radially inner surface, wherein the radially inner surface is longitudinally straight before being placed into service.

24. The seal ring of claim 23, wherein the circular ring is designed and configured to be reusable because there is only elastic deformation during service at a rated working pressure of 20,000 psi without plastic deformation.

25. A piping system, comprising: first and second opposing flanges or hubs ("flanges") and a seal ring according to claim 22 between the flanges, wherein each of the first and second opposing flanges has an annular ridge, wherein the annular ridge of the first flange projects toward the annular ridge of the second flange.

26. The piping system of claim 25, wherein the web has a radially inward portion that is adjacent to the inner sealing portion and a radially outward portion that is adjacent to the outer sealing portion, and wherein the web has a greater longitudinal thickness in the portion that is adjacent to the inner sealing portion than in the portion that is adjacent to the outer sealing portion.

27. The piping system of claim 26, wherein the web has a radially outwardly sloping shoulder located at about the midpoint between the inner sealing portion and the outer sealing portion.

28. The piping system of claim 25, wherein the inner sealing portion and the outer sealing portion of the seal ring have sloping sides that face one another, wherein the annular ridges on the first and second flanges have sloping faces, and wherein the sloping sides of the inner and outer sealing portions matingly engage the sloping faces of the first and second flanges for providing seals to keep pressurized fluid within the piping system and to keep pressurized water that is outside of the piping system from entering into the piping system.

29. The piping system of claim 25, wherein the web has a longitudinal thickness that is at least one-third of the longitudinal length of the inner sealing portion.

30. The piping system of claim 29, wherein the longitudinal thickness of the web is at least as great as the radial thickness of the outer sealing portion that is adjacent to the web.

31. The piping system of claim 25, wherein the inner sealing portion and the outer sealing portion of the seal ring have sloping sides that face one another, wherein the annular ridges on the first and second flanges have sloping faces, and wherein the sloping sides of the inner and outer sealing portions matingly engage the sloping faces of the first and second flanges, wherein the longitudinal length of the inner sealing portion is greater than the longitudinal length of the outer sealing portion, wherein the first and second flanges and the seal ring are designed and sized so that the inner sealing portion can seal against the annular ridges in the first and second flanges for containing fluid in the piping system at 20,000 psi (1,379 bar) without leakage.

32. The piping system of claim 31, wherein the first and second flanges and the seal ring are designed and sized so that the outer sealing portion can seal against the annular ridges in the first and second flanges for preventing water having a pressure of about 5,000 psi (345 bar) from getting into the piping system.

33. The piping system of claim 25, wherein the web has an axial length, and wherein the web has at least one hole extending through its axial length.

34. The piping system of claim 25, wherein the inner sealing portion and the outer sealing portion of the seal ring have sloping sides that face one another, wherein the annular ridges on the first and second flanges have sloping faces, wherein the sloping sides of the inner and outer sealing portions matingly engage the sloping faces of the first and second flanges, and wherein the seal ring is designed and configured so that the sloping sides of the inner and outer sealing portions engage the sloping faces of the annular ridges at the same time when the first and second opposing flanges are drawn together.

35. A seal ring for providing a seal between first and second flanges or hubs in a piping or flow-containment system, the seal ring comprising: a ring having upstream and downstream sides, a radially inner sealing portion, a radially outer sealing portion and a web that extends radially and connects the inner and outer sealing portions together integrally, wherein the inner sealing portion and the outer sealing portion of the ring have opposing sloping sides that face one another, wherein the ring does not have any secondary seal elements, wherein the inner and outer sealing portions are concentric hollow cylinders that have non-uniform wall thicknesses due to the sloping sides, wherein the seal ring has a diameter that is coaxial with the web and a longitudinal length that is perpendicular to the diameter and extends from the upstream side to the downstream side, wherein the longitudinal length of the inner sealing portion is not equal to the longitudinal length of the outer sealing portion, and wherein the web has a first longitudinal thickness proximal to the inner sealing portion and a second longitudinal thickness proximal to the outer sealing portion, and a sloping transition or a shoulder between the first and second longitudinal thicknesses.

36. The seal ring of claim 35, wherein the inner and outer sealing portions are concentric hollow cylinders that have non-uniform wall thicknesses due to the sloping sides.

37. The seal ring of claim 35, wherein the longitudinal length of the inner sealing portion is greater than the longitudinal length of the outer sealing portion.

38. The seal ring of claim 35, wherein the longitudinal length of the inner sealing portion is greater than the longitudinal length of the outer sealing portion, and wherein the web is thicker longitudinally proximal to the inner sealing portion than proximal to the outer sealing portion.

39. The seal ring of claim 35, wherein the web has a greater longitudinal thickness than the thickest radial portion of the inner and outer sealing portions.

40. The seal ring of claim 35, wherein the seal ring is designed and configured so that the sloping sides of the inner and outer sealing portions engage an annular ridge in first and second opposing flanges at the same time when the flanges are drawn together, and wherein the ring is designed and configured to be reusable because there is only elastic deformation during service at a rated working pressure of 20,000 psi without plastic deformation.

41. The seal ring of claim 35, wherein the longitudinal length of the inner sealing portion is greater than the longitudinal length of the outer sealing portion, and wherein the seal ring is designed and configured so that the sloping sides of the inner and outer sealing portions engage an annular ridge in first and second opposing flanges at the same time when the flanges are drawn together.

* * * * *